May 31, 1932.  A. M. BEVIER  1,860,647
WEIGHT INDICATING SUPPORT
Filed Nov. 24, 1930  2 Sheets-Sheet 1

Inventor
A. M. Bevier.
By Geo. Stevens.
Attorney

May 31, 1932.  A. M. BEVIER  1,860,647
WEIGHT INDICATING SUPPORT
Filed Nov. 24, 1930  2 Sheets-Sheet 2
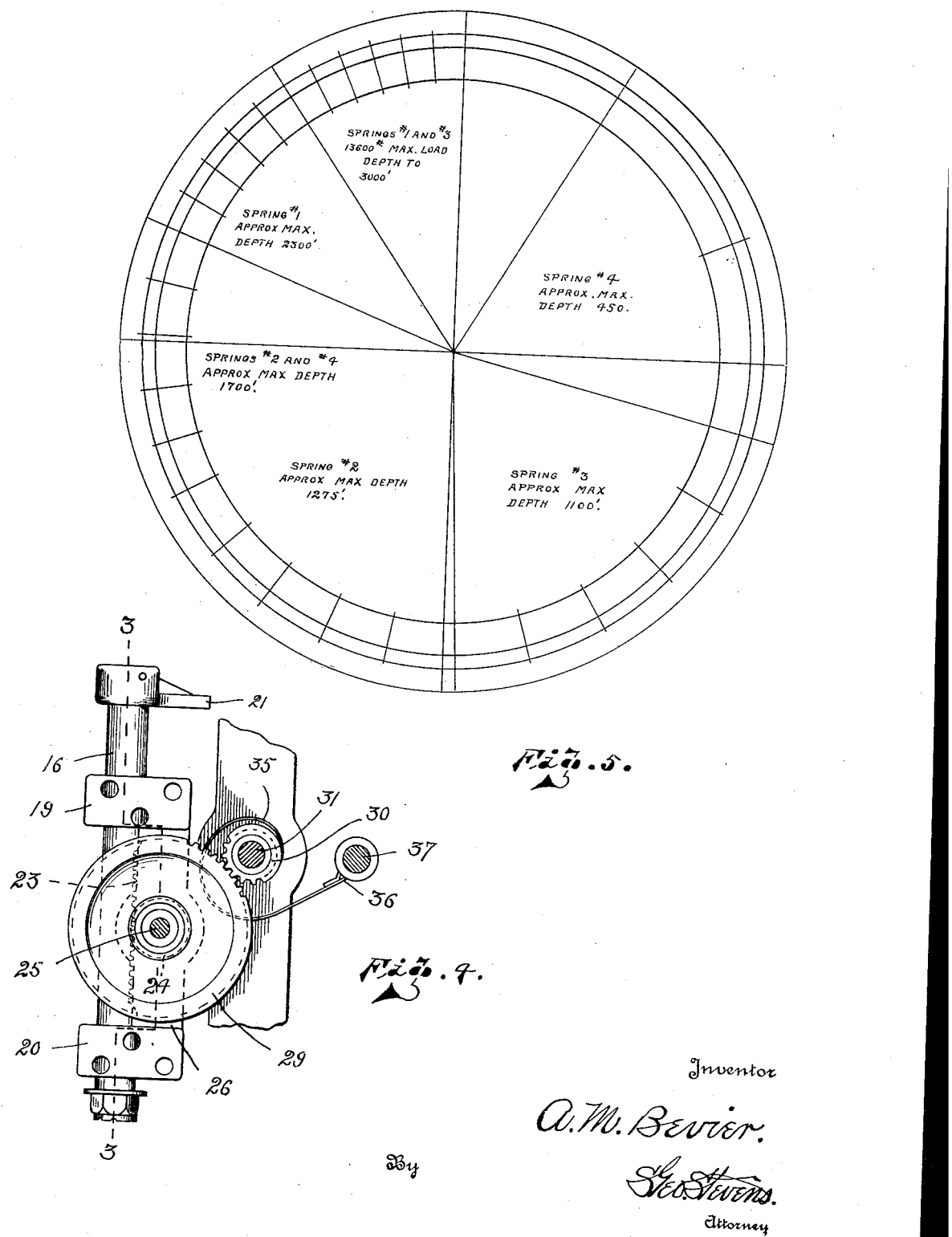

Patented May 31, 1932

1,860,647

UNITED STATES PATENT OFFICE

ABRAM M. BEVIER, OF DULUTH, MINNESOTA

WEIGHT INDICATING SUPPORT

Application filed November 24, 1930. Serial No. 497,831.

This invention relates to weight indicating supports and has special reference to a block like connection for attachment to the end of a hoisting line used in the art of drilling.

The principal object of the invention is to produce a simple and efficient unit for installation within a pulling or hoisting line whereby to automatically indicate the relative weight or stress upon the line.

Another object is to provide simple means whereby the indicator may be set when a predetermined weight of the material being suspended is known, so that the device indicates the proportional weight or stress on the object contacted, thus avoiding the necessity of relative calculations were a common weighing scale used.

Other advantages of the novel construction will appear in the further description thereof.

Referring now to the accompanying drawings, forming part of this application, and wherein like reference characters indicate like parts:

Figure 4 is an elevation of the pointer operating mechanism, partly broken away for convenience of illustration.

Figure 5 is a guide chart for the marking of the dial and use of different springs in the weight indicator when drilling at different predetermined depths.

Figure 1:
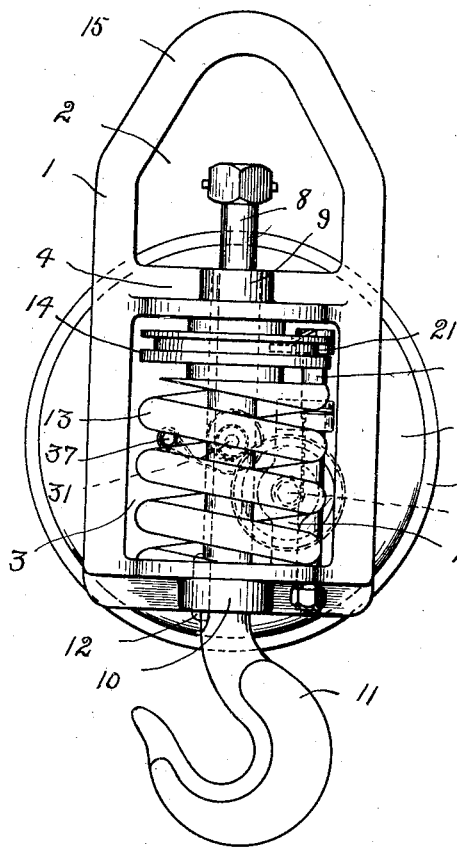
Figure 1 is a rear elevation of an indicator unit embodying the invention.
Figure 3:
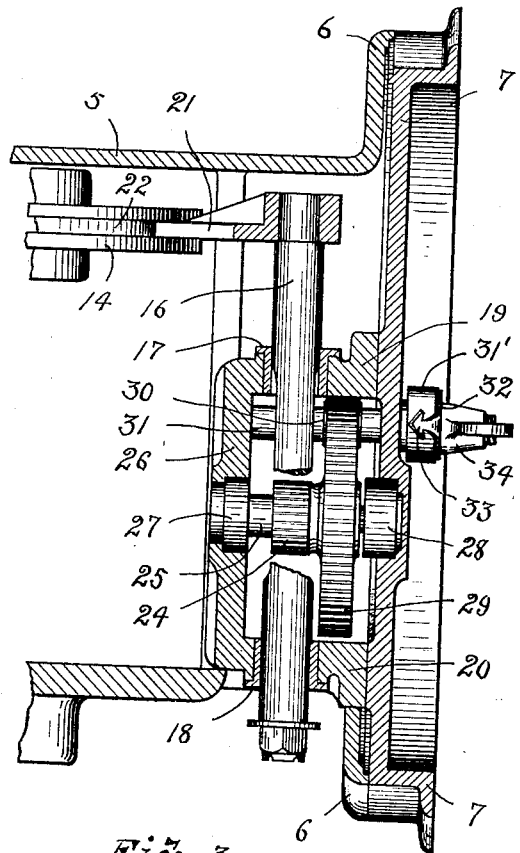
Figure 3 is a section on the line 3—3, Figure 4, partly broken away and partly in elevation.

The unit comprises a normally vertically disposed open link like structure indicated at 1, of sufficient strength to withstand the necessary stress imparted by the weight of the load carried, and divided into two open spaces 2 and 3 by the transverse wall 4. The lower portion of the link has a laterally projecting circularly shaped housing 5 fixed thereto in any desired manner, and which housing terminates upon its free face with an enlarged annular extension 6 into which is fitted the indicator dial 7, and on the back of which dial is attached the mechanism for operating the pointer of the dial, which will be hereinafter described.

Centrally of the spaces 2 and 3 of the link 1 is reciprocably mounted the bolt 8 having its bearings 9 and 10 in the division wall 4 and the lower transverse wall of the link, respectively; this bolt terminating in a suitable hook 11 for attachment as in this instance to the rotary drill rods of a drilling machine, not shown. This bolt is suitably splined for reception of the gib key indicated at 12 in the lower bearing 10 to prevent the hook from swiveling in the link, and while for convenience of illustration I have shown the key at right angles to its preferred position, the hook is designed to extend transverse the link 1.

About the bolt or shank 8 of the hook 11 and within the space 3 is mounted the expansive helical spring 13 which is surmounted by the circumferentially grooved disc 14, the latter being threaded thereupon and fixed as by a suitable pin or key to the rod, so that when stress occurs, as for example by a weight attached to the hook between it and the bight 15 of the link, any reciprocation of the rod 8 within the link will cause the disc 14 to similarly raise or fall; it being understood that the proper strength of spring is predetermined in respect to the maximum load to be carried.

The vertical motion of the disc 14 is what operates the indicating mechanism, and comprises a vertically reciprocable rack 16 mounted within suitable bearings 17 and 18 carried by the brackets 19 and 20, fixed to the back of the dial 7.

The rack 16 carries upon its uppermost end the radially extending arm 21, the free end of which is engaged within the groove 22 of the disc 14 so that as the latter is raised or lowered the rack 16 is similarly affected, and, it being cogged or geared upon one face as at 23 is made to rotate the pinion 24 on the shaft 25. The brackets 19 and 20 carry intermediate their innermost ends the upright bearing member 26 which forms the innermost support for the shaft 25, the outer support being within the dial, 100 and whereat are located suitable bearings as at 27 and 28, respectively.

Figure 2:
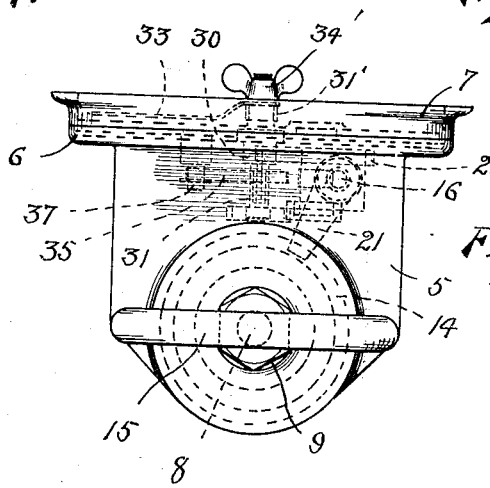
Figure 2 is a top plan view of same.

It will be noted by viewing Figure 2 of the drawings that the rack 16 is offset somewhat in respect to a central line through the housing 5 from the center of the link 1, thus permitting of a larger spur gear 29 being installed upon the shaft 25 and meshing with the smaller driven gear 30 on the dial shaft 31 so that when motion is imparted to the shaft 25 it will be transmitted and materially augmented by this chain of gears and rack, resulting, comparatively, in the slightest vertical motion of the bolt 8 being transmitted to the dial shaft and materially rotating same.

Now on this dial shaft and outwardly of the face of the dial is fixed the jam ring 31', outwardly of which and loosely mounted on the shaft is the hub 32 of the pointer 33. For holding this pointer in any predetermined position on the shaft there is provided the wing nut 34 so that the pointer may be set at any desired position in respect to the dial, the object of which will be described later.

As a simple means for steadying the action of the dial shaft I have provided the flat helical spring 35 one end of which is wound about the shaft 31, and the other end as at 36 attached to the pin 37 fixed to the back of the dial 7, it tending at all times to return the pointer to zero.

It is to be understood that the face of the dial 38 is left blank, that is without any figures or lines thereon, except possibly equidistant radial lines dividing the circle into four equal parts, one line being vertical and the other horizontal, and that the position of the pointer when under the stress of varying weights be marked upon the dial so that the relative weight on the cutting end of the drill may be readily determined by the position of the pointer; it having previously been fixed upon the shaft in accordance with the following procedure:

For example, in ordinary drilling it is desirable to have no more than approximately five hundred pounds weight on the "shot". Assuming then that drilling has proceeded to a point where the total weight of the rods approximates five hundred pounds and it is essential to add another length of rod to continue drilling. The rods are then lifted free from the bottom of the hole and the pointer on the dial fixed in its vertical position by means of the wing nut 34 and this position marked on the dial. The additional length of rod, weighing approximately one hundred pounds, is then added, and the rods again lifted free and the position of the pointer thus affected marked on the dial, such mark indicating, of course, only the weight of the section added, so that when the rods are lowered until they engage the bottom of the hole and stress gradually released until the pointer returns to its vertical position, it is obvious that only five hundred pounds weight will yet be in suspension, and that if the desired five hundred pounds is to be on the bit, the lifting stress is further released until the pointer so indicates; thus the pointer indicates the proportion of the total weight that is actually on the cutting bit.

It is further apparent from the indicia on the dial, illustrated in Figure 5, that at different predetermined depths different strengthened springs, as indicated at 13, are used, or any desired grouping of same, to compensate for the variation in weight of the tools used, and which, of course, would require different spacing of the radial lines, as indicated.

Having thus described my invention, what I claim and desire to secure by Letters Patent, is:

1. A weight indicator of the class described comprising a vertically disposed link, a vertically reciprocable spring controlled hook within the link, a housing upon one side of the link, a dial and pointer externally of said housing, mechanism within the housing for imparting motion from the hook to the pointer for the purpose described.

2. In combination a vertically disposed link, a weight supporting hook depending from said link and reciprocable therein, an expansive spring within the link about the shank of the hook, and motion imparting means above the spring within the link and attached to the shank of the hook, a dial and pointer carried by the link, and means for operating the pointer directly connected with said motion imparting means.

In testimony whereof I affix my signature.

ABRAM M. BEVIER.